(12) United States Patent
Takahashi et al.

(10) Patent No.: US 11,695,908 B2
(45) Date of Patent: Jul. 4, 2023

(54) INFORMATION PROCESSING APPARATUS AND INFORMATION PROCESSING METHOD

(71) Applicant: SONY CORPORATION, Tokyo (JP)

(72) Inventors: Kei Takahashi, Tokyo (JP); Tsuyoshi Ishikawa, Kanagawa (JP); Ryouhei Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 17/040,231

(22) PCT Filed: Feb. 22, 2019

(86) PCT No.: PCT/JP2019/006916
§ 371 (c)(1),
(2) Date: Sep. 22, 2020

(87) PCT Pub. No.: WO2019/187862
PCT Pub. Date: Oct. 3, 2019

(65) Prior Publication Data
US 2021/0014468 A1   Jan. 14, 2021

(30) Foreign Application Priority Data
Mar. 30, 2018   (JP) .................................. 2018-067460

(51) Int. Cl.
*H04N 13/117*   (2018.01)
*G06T 7/73*   (2017.01)
(Continued)

(52) U.S. Cl.
CPC ....... *H04N 13/117* (2018.05); *G02B 27/0093* (2013.01); *G02B 27/0179* (2013.01);
(Continued)

(58) Field of Classification Search
CPC .. H04N 13/117; H04N 13/282; H04N 13/383; H04N 13/378; H04N 13/344;
(Continued)

(56) References Cited

U.S. PATENT DOCUMENTS

2007/0132785 A1*   6/2007   Ebersole ............... A63F 13/837
345/633
2017/0153713 A1*   6/2017   Niinuma ................ G09G 5/377
(Continued)

FOREIGN PATENT DOCUMENTS

EP   3398666 A1   11/2018
JP   2004-341572 A   12/2004
(Continued)

OTHER PUBLICATIONS

International Search Report and Written Opinion of PCT Application No. PCT/JP2019/006916, dated May 14, 2019, 07 pages of ISRWO.

*Primary Examiner* — Nasim N Nirjhar
(74) *Attorney, Agent, or Firm* — Chip Law Group

(57) ABSTRACT

There is provided an information processing apparatus, information processing method, and recording medium that each allow a user to recognize a border of a virtual space without breaking the world view of the virtual space. The information processing apparatus includes a control unit that tracks a motion of a user to present an image of a virtual space to the user, and performs distance control to increase a distance between a viewpoint of the user and a border region in the virtual space while an operation of the user coming closer toward the border region is being inputted. The border region is fixed at a specific position in the virtual space.

8 Claims, 16 Drawing Sheets

(51) Int. Cl.
*H04N 13/282* (2018.01)
*G02B 27/00* (2006.01)
*G02B 27/01* (2006.01)

(52) U.S. Cl.
CPC ............ *G06T 7/75* (2017.01); *H04N 13/282* (2018.05); *G02B 2027/0187* (2013.01)

(58) Field of Classification Search
CPC .. G06T 7/75; G02B 27/0093; G02B 27/0179; G02B 2027/0187; G06F 3/04815; G06F 3/0484; A63F 13/25; A63F 13/428; A63F 13/525
See application file for complete search history.

(56) References Cited

U.S. PATENT DOCUMENTS

| | | | | |
|---|---|---|---|---|
| 2018/0204375 | A1* | 7/2018 | Baek | G06T 19/006 |
| 2019/0179509 | A1* | 6/2019 | Daie | G06F 3/0485 |
| 2019/0244416 | A1* | 8/2019 | Tamaoki | G09G 5/00 |
| 2020/0134910 | A1* | 4/2020 | Kroon | H04N 13/111 |

FOREIGN PATENT DOCUMENTS

| | | |
|---|---|---|
| JP | 2017-119031 A | 7/2017 |
| WO | 2016/002318 A1 | 1/2016 |

* cited by examiner

[FIG. 1]
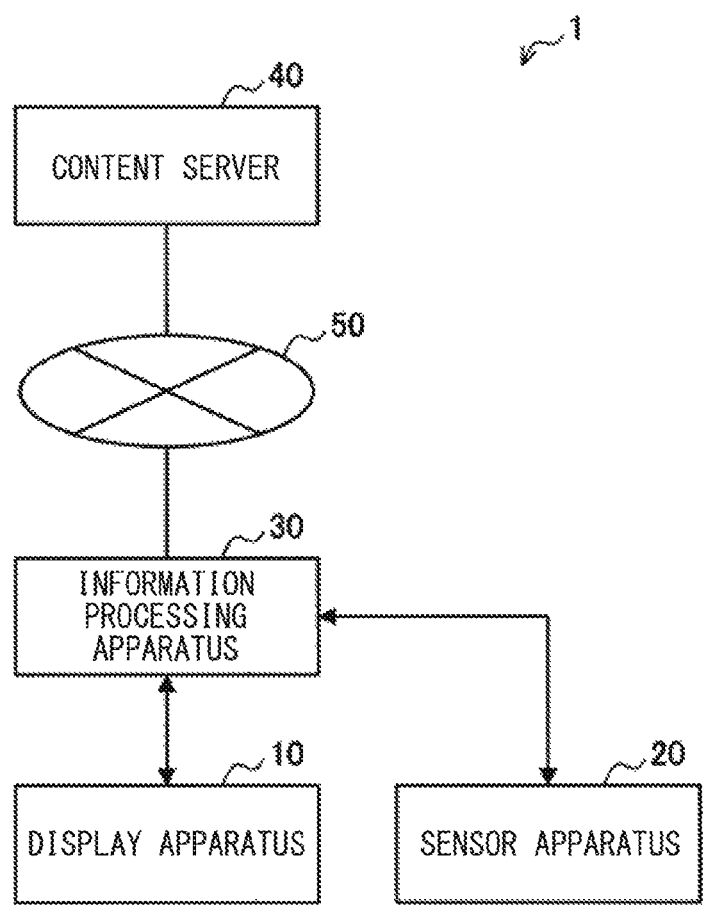

[FIG. 2]
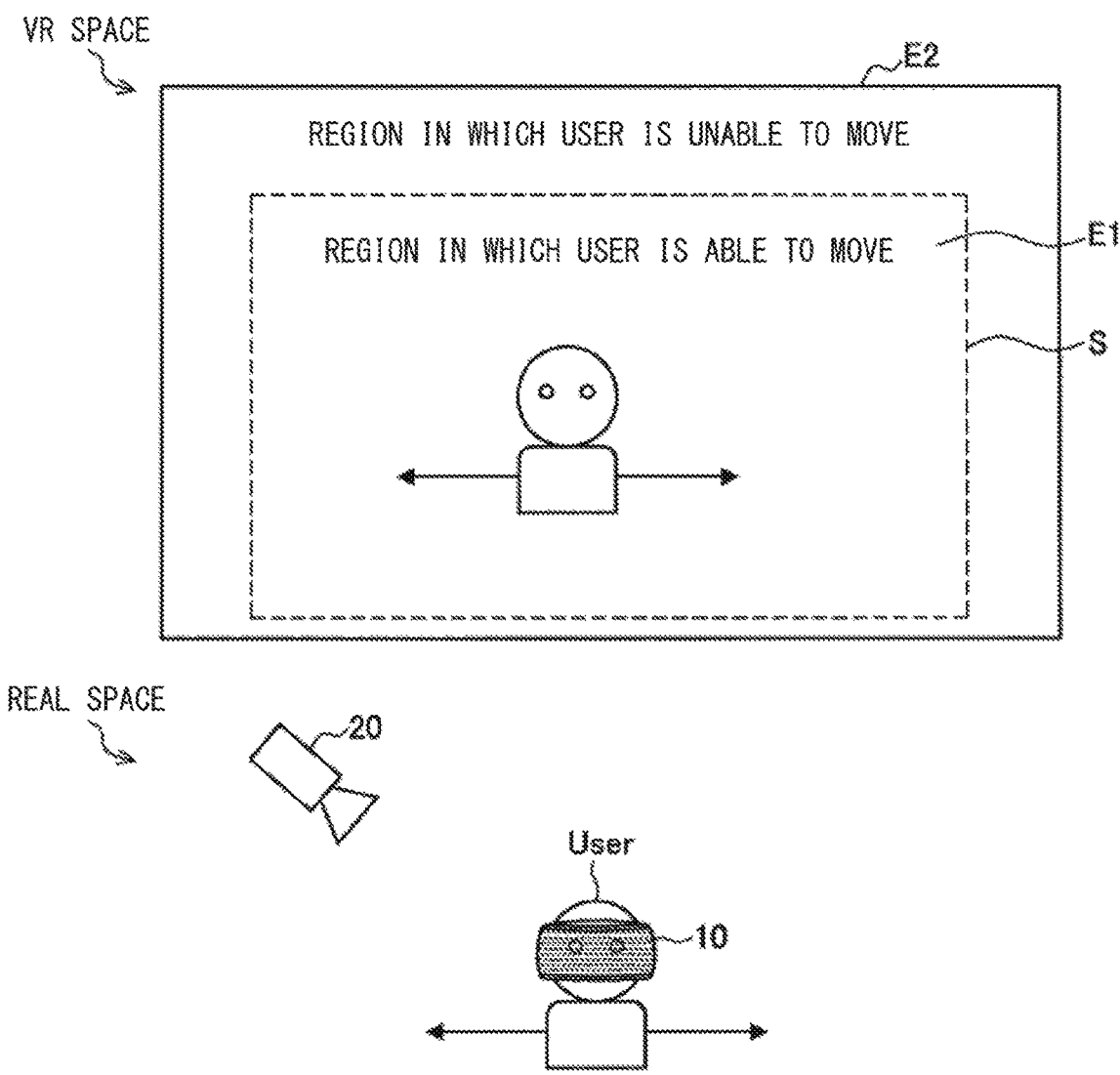

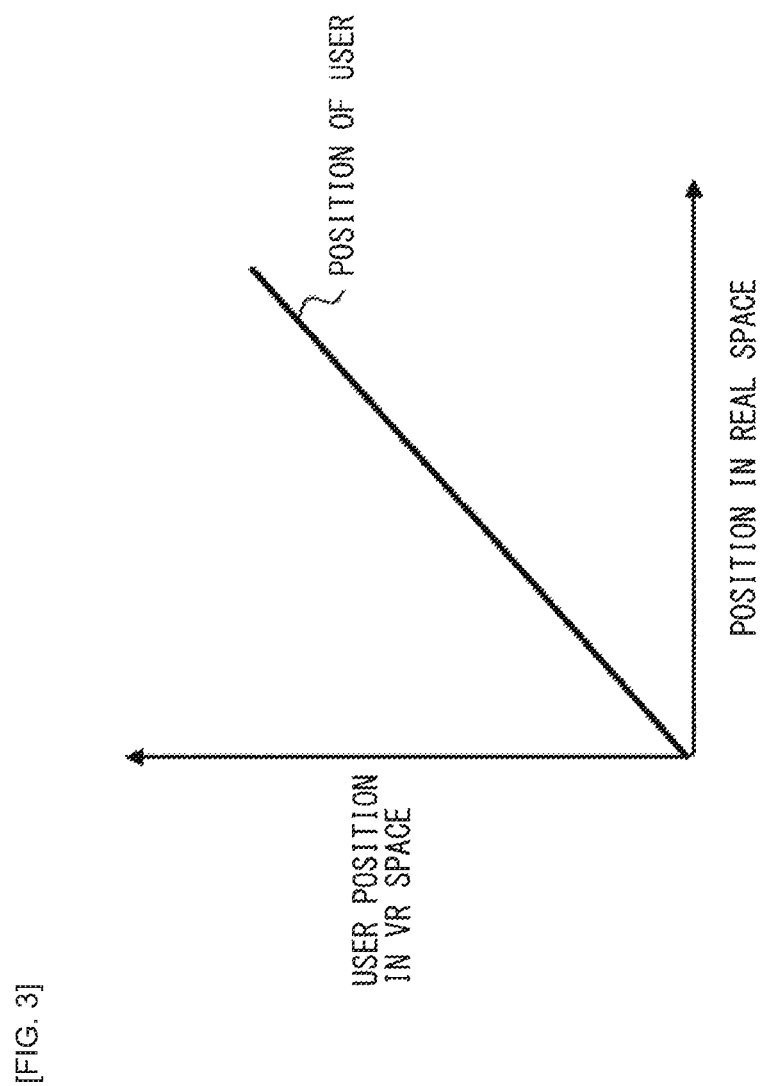
[FIG. 3]

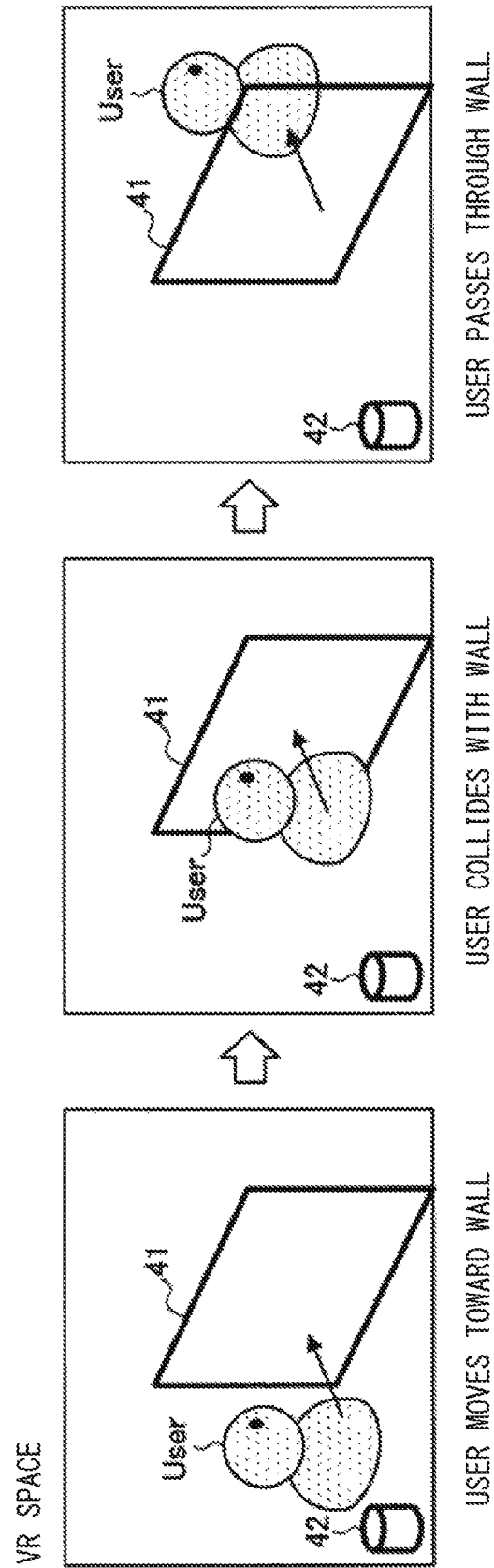

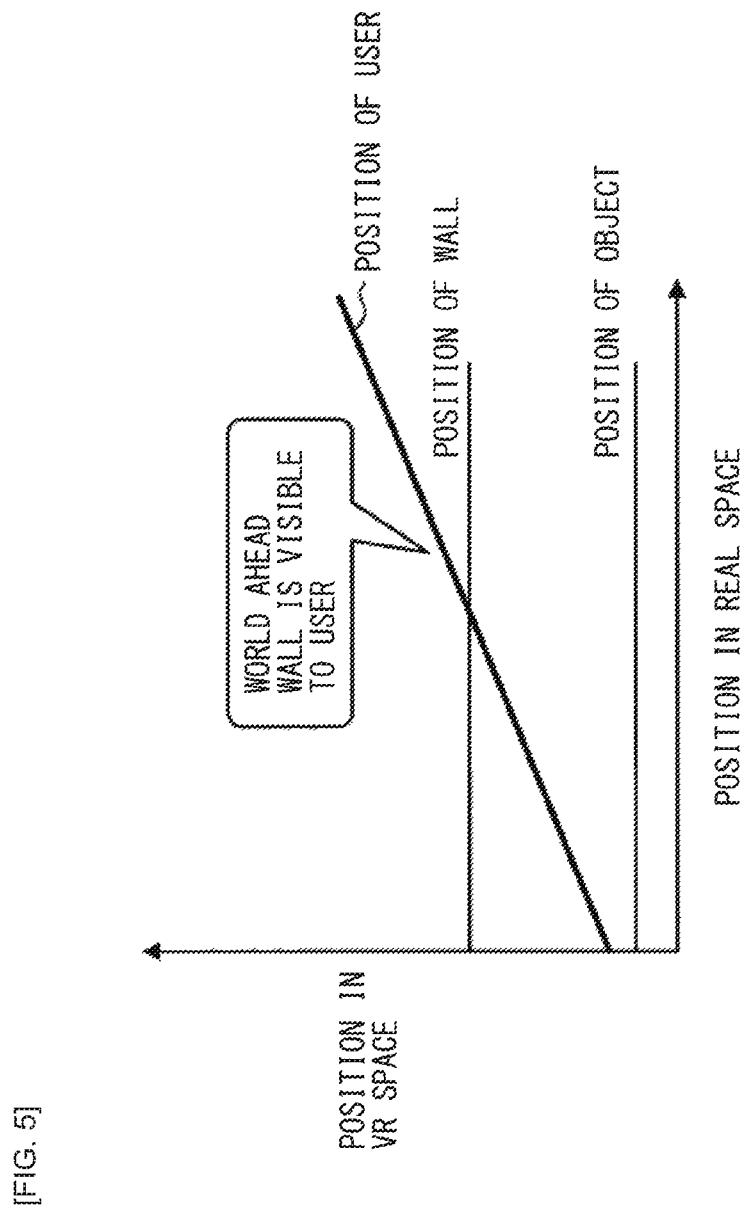
[FIG. 5]

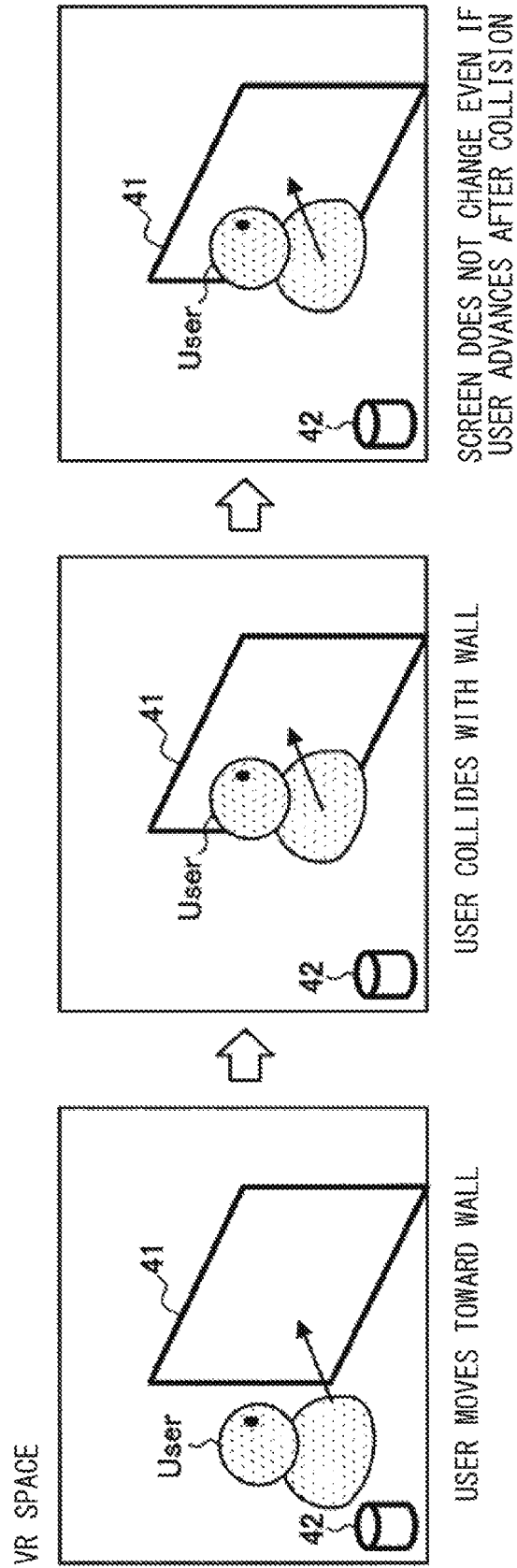

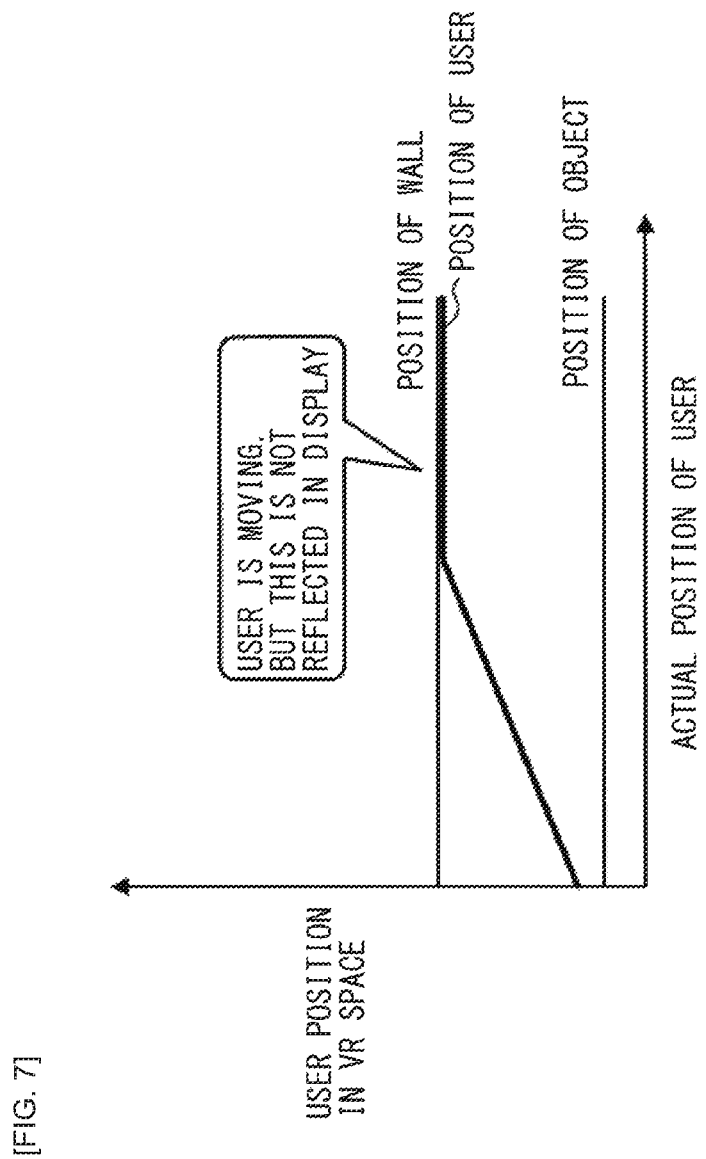
[FIG. 7]

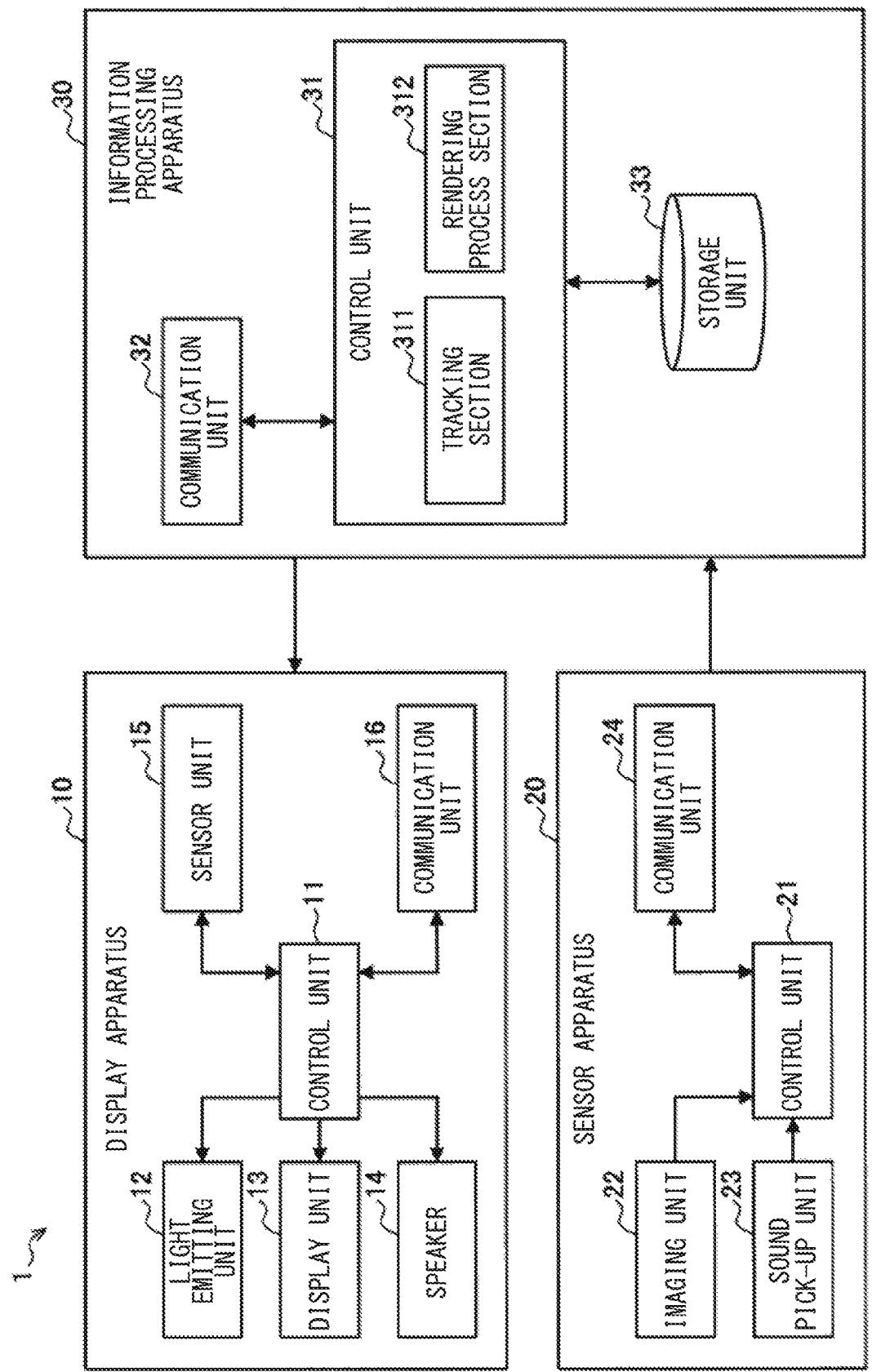
[FIG. 8]

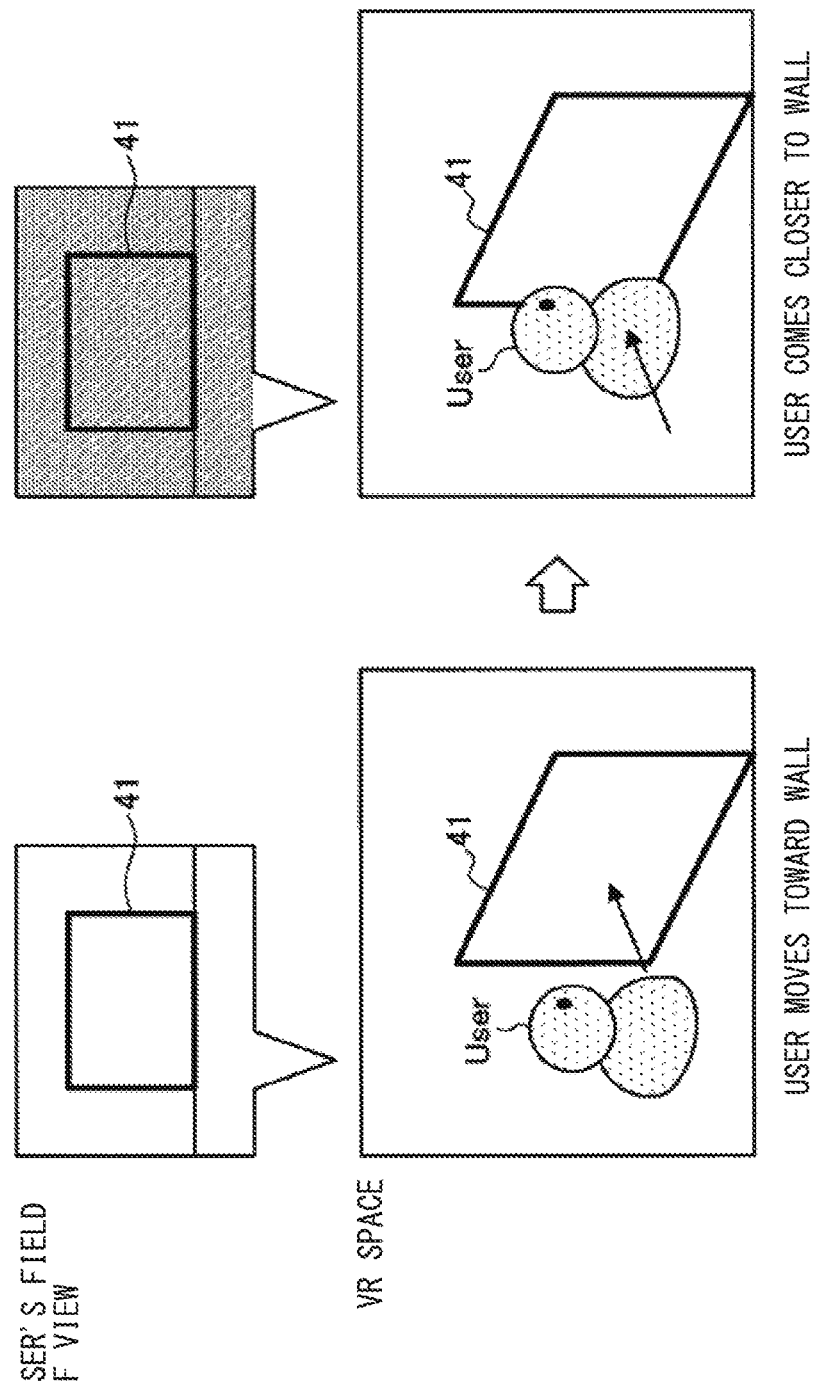
[FIG. 9]

[FIG. 10]
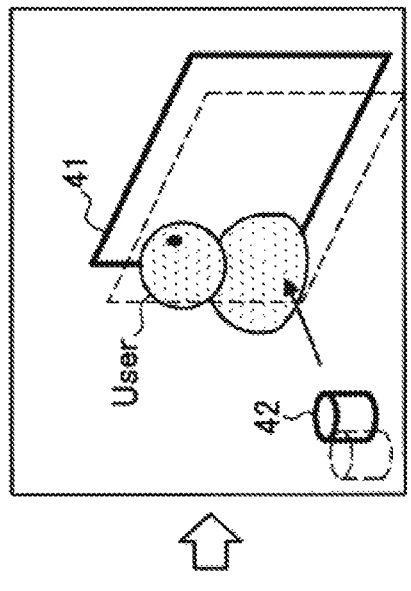
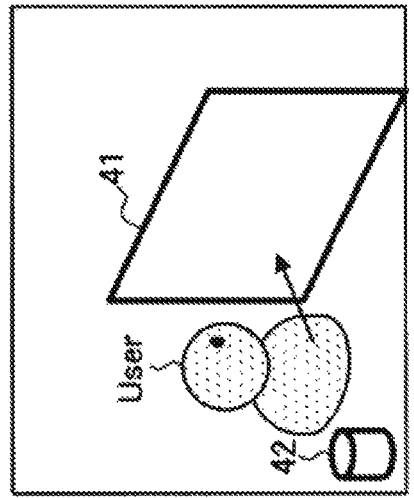

[FIG. 11]
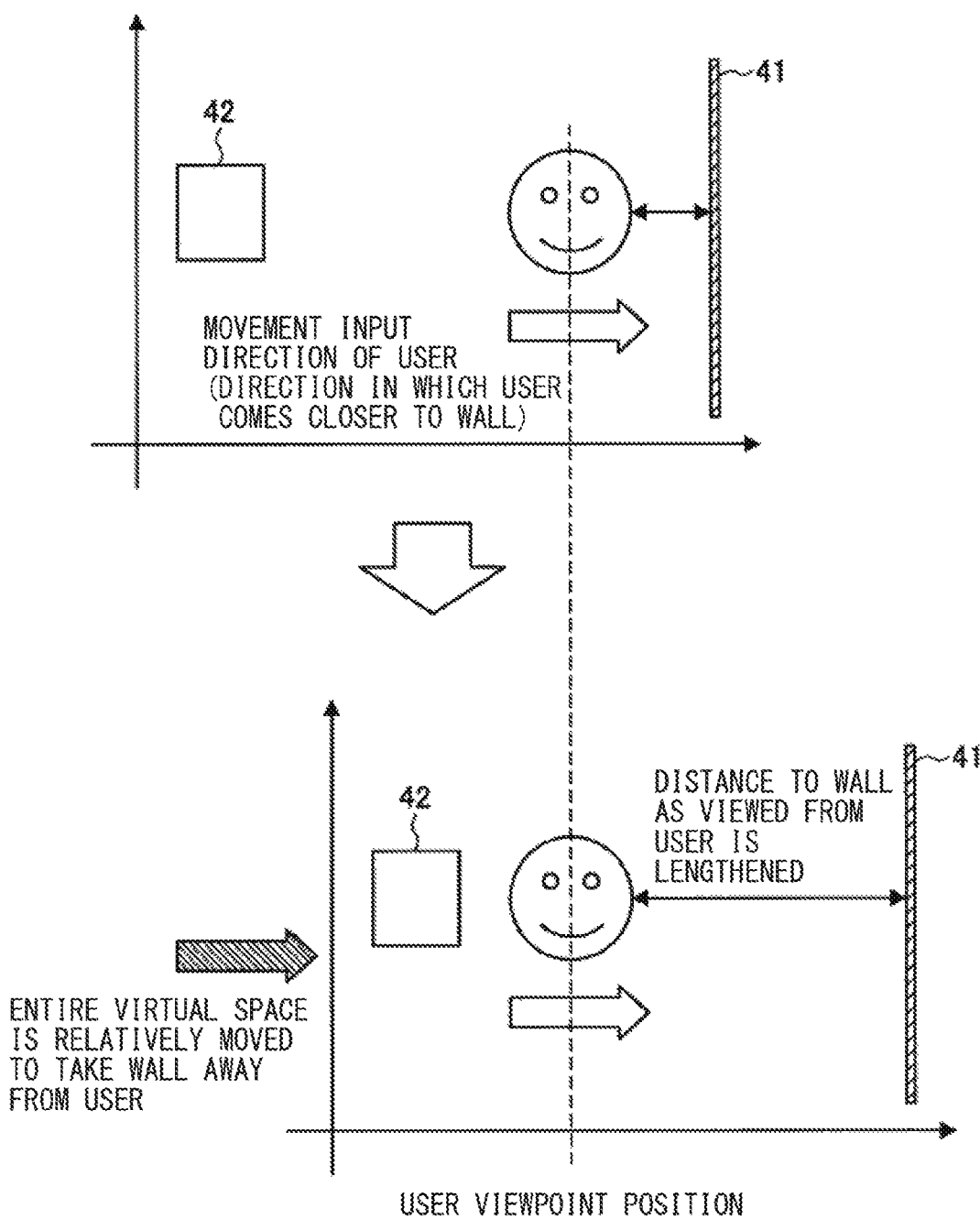

[FIG. 12]
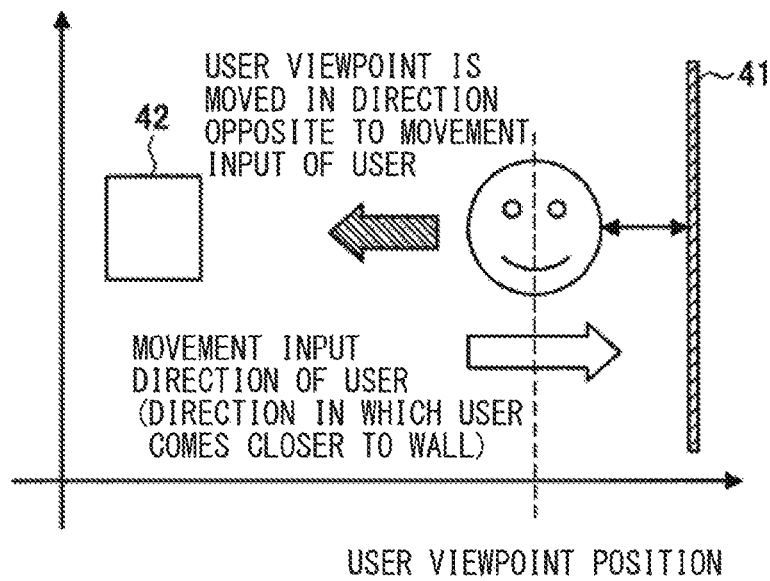
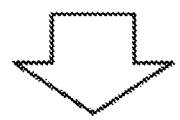
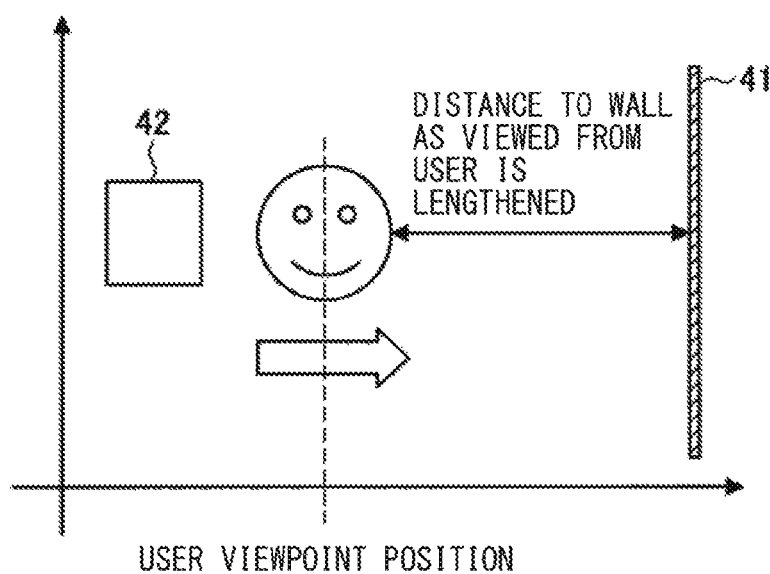

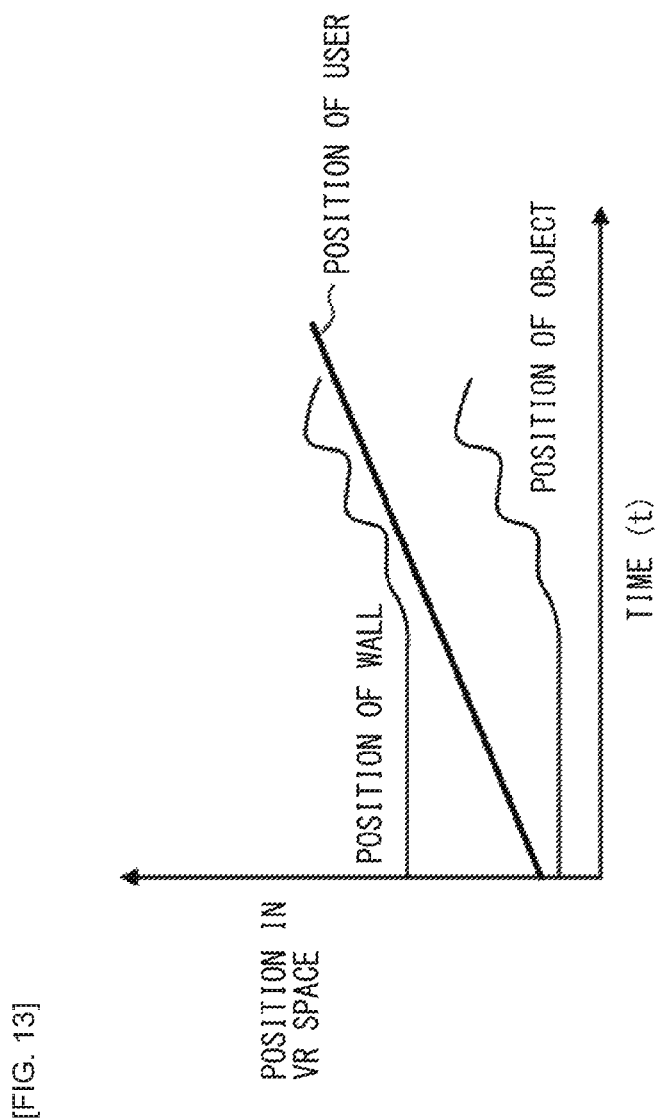
[FIG. 13]

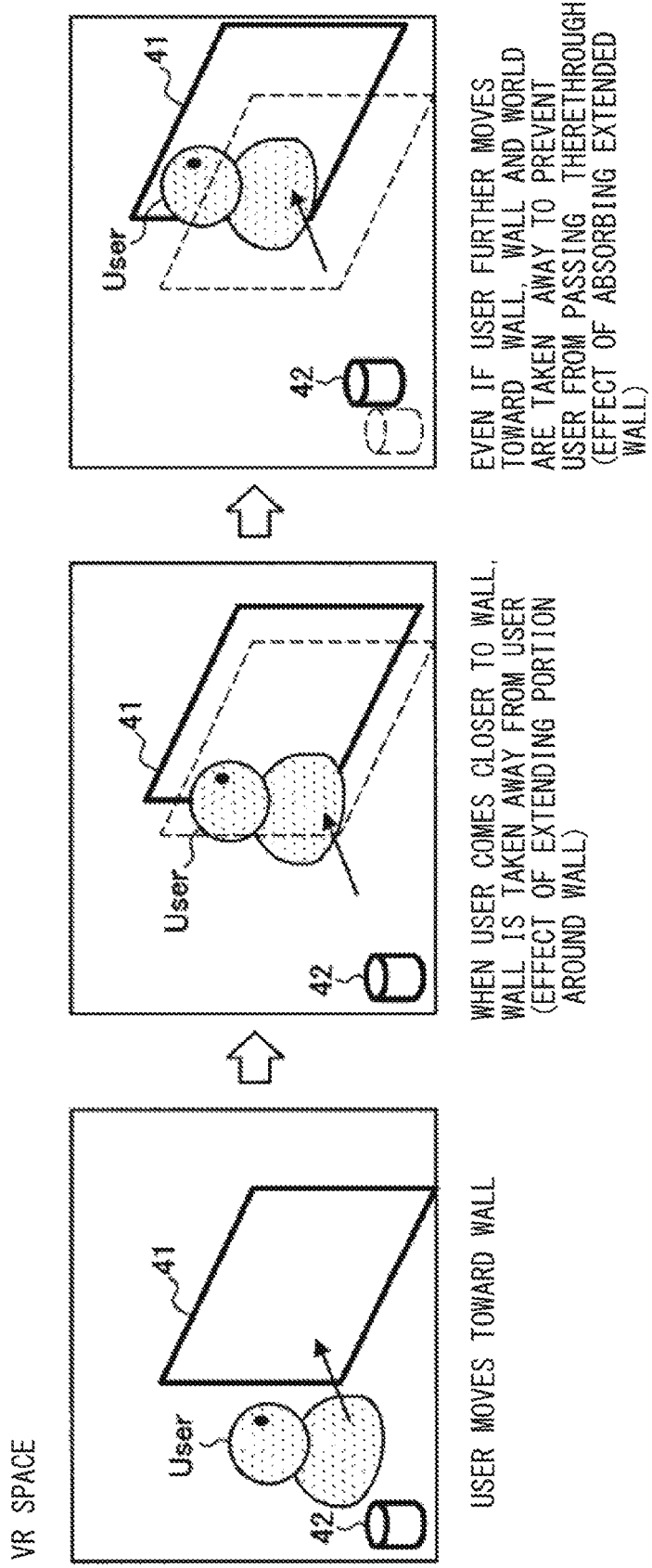

[FIG. 15]
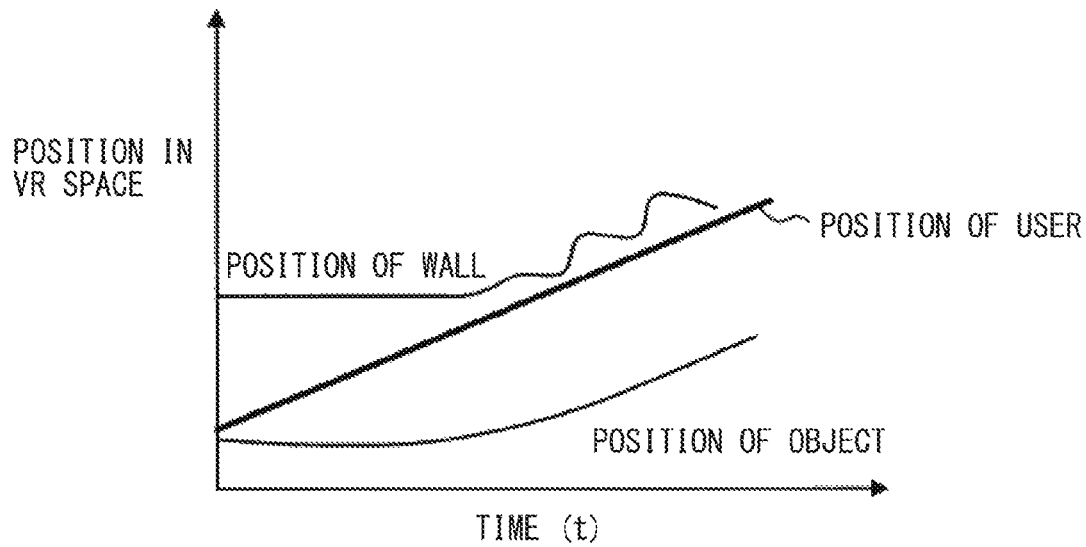
[FIG. 16]
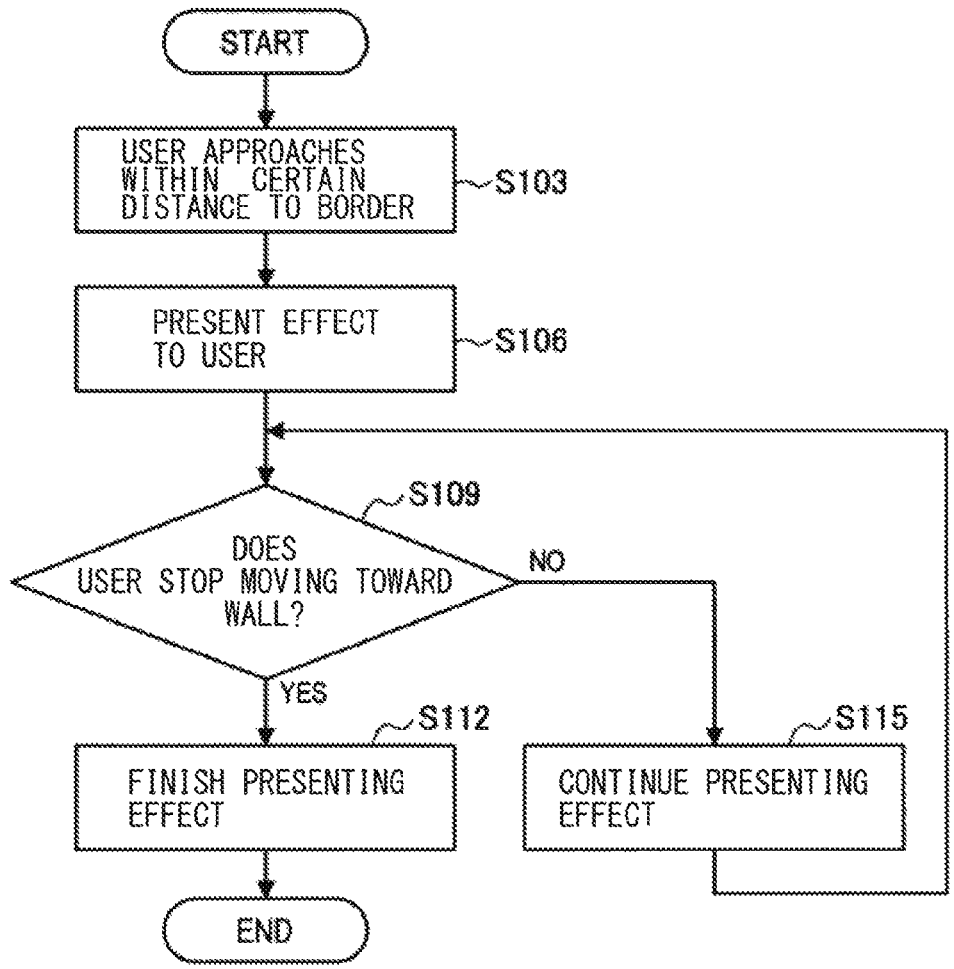

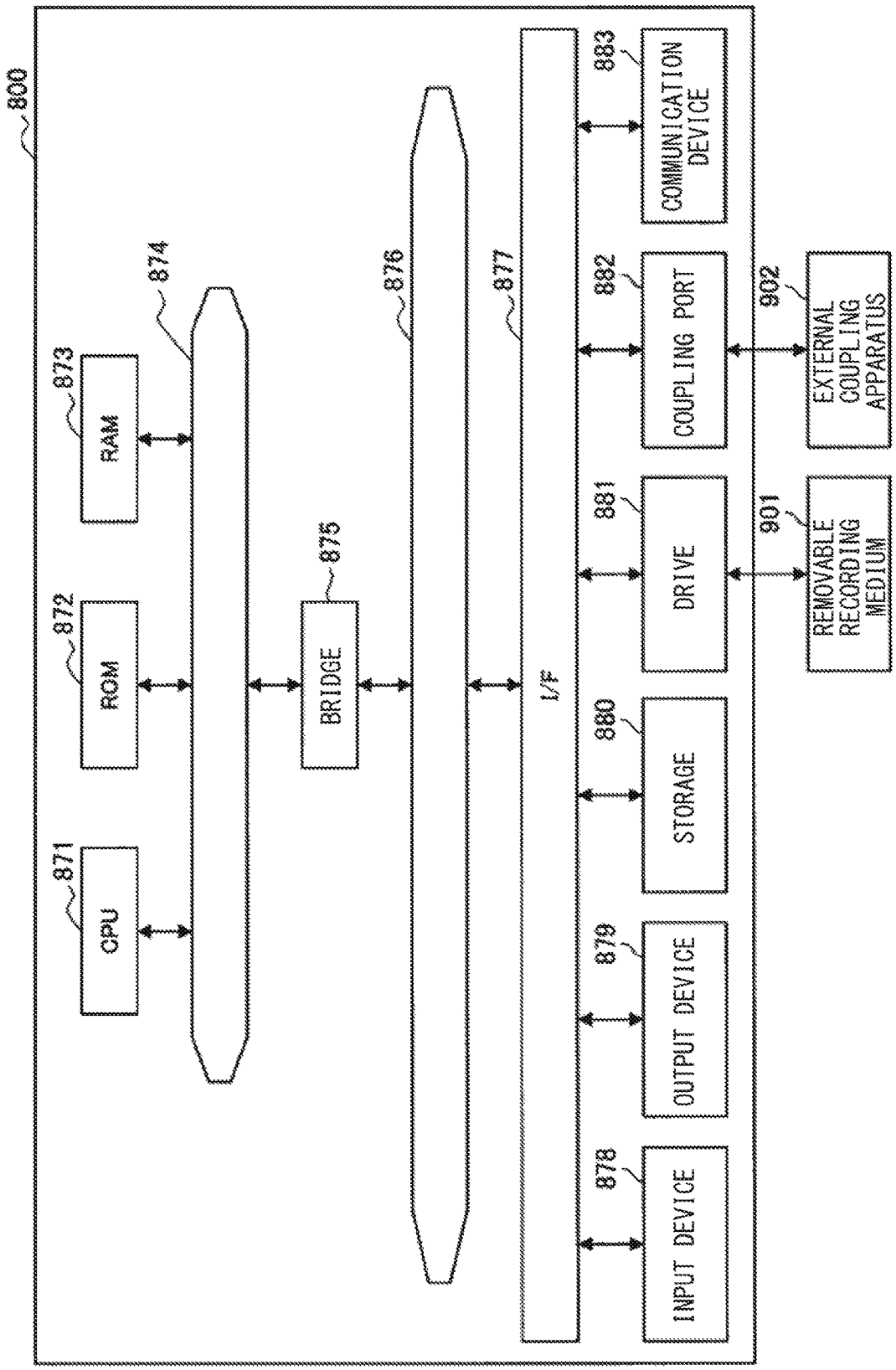

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/006916 filed on Feb. 22, 2019, which claims priority benefit of Japanese Patent Application No. JP 2018-067460 filed in the Japan Patent Office on Mar. 30, 2018. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, there has been proposed VR (Virtual Reality) technology for presenting a video and sound of a virtual reality space to a user by using a display apparatus or so-called head mounted display (HMD) that is worn on the head or face of the user. Configuring the HMD mounted on the head to block the outside world strengthens a sense of virtual reality that is viewed and listened to.

In addition, the VR technology allows an image obtained by cutting out a portion of a wide-angle image to be presented following a motion of a user's head. For example, as described in PTL 1 below, it is possible to acquire a motion of the head of a user from a gyro sensor or the like and make a 360-degree omnidirectional video actually felt that follows the motion of the head of the user. It is possible to achieve the free viewpoint viewing and the viewpoint moving environment by moving a display region in the wide-angle image to cancel the motion of the head detected by the gyro sensor.

In addition, the use of position tracking technology that recognizes the position of HMD allows a user moving forward, backward, left, or right in an actual space to also move forward, backward, left, or right in a virtual space in the same movement amount. The user is thus able to enjoy a more immersive VR experience.

CITATION LIST

Patent Literature

PTL 1: International Publication No. WO 2016/002318

SUMMARY OF THE INVENTION

Problems to be Solved by the Invention

Some content presented as a virtual space, however, has content only within a designated range or allows for movement only within a range designated by a wall or the like. When a user moves beyond the wall or the designated range in such a case, the screen is blacked out or CG that is not the original content is rendered because there is no content presentable to the user. This spoils the world view of the original content inconsistent to degrade a user experience.

Accordingly, the present disclosure proposes an information processing apparatus, information processing method, and recording medium that each allow a user to recognize a border of a virtual space without breaking the world view of the virtual space.

Means for Solving the Problems

According to the present disclosure, there is proposed an information processing apparatus including a control unit that tracks a motion of a user to present an image of a virtual space to the user, and performs distance control to increase a distance between a viewpoint of the user and a border region in the virtual space while an operation of the user coming closer toward the border region is being inputted. The border region is fixed at a specific position in the virtual space.

According to the present disclosure, there is proposed an information processing method including, by a processor: tracking a motion of a user to present an image of a virtual space to the user; and performing distance control to increase a distance between a viewpoint of the user and a border region in the virtual space while an operation of the user coming closer toward the border region is being inputted. The border region is fixed at a specific position in the virtual space.

According to the present disclosure, there is proposed a recording medium having a program recorded therein, the program causing a computer to function as a control unit that tracks a motion of a user to present an image of a virtual space to the user, and performs distance control to increase a distance between a viewpoint of the user and a border region in the virtual space while an operation of the user coming closer toward the border region is being inputted. The border region is fixed at a specific position in the virtual space.

Effects of the Invention

As described above, according to the present disclosure, it is possible to cause a user to recognize a border of a virtual space without breaking the world view of the virtual space.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is a diagram describing an overview of an information processing system according to an embodiment of the present disclosure.

FIG. 2 is a diagram describing a border of a virtual space.

FIG. 3 is a graph illustrating a relationship between a movement amount of a user in a real space and a movement amount of the user in a virtual space.

FIG. 4 is a diagram describing a case where an expression of penetrating a border of the virtual space such as a wall is presented when a user moves beyond the border.

FIG. 5 is a graph illustrating the relationship between the movement amount of the user in the real space and the movement amount of the user in the virtual space in an example illustrated in FIG. 4.

FIG. 6 is a diagram describing a case where an expression of preventing a viewpoint of a user from advancing beyond the border of the virtual space such as a wall is presented when the user moves beyond the border.

FIG. 7 is a graph illustrating the relationship between the movement amount of the user in the real space and the movement amount of the user in the virtual space in an example illustrated in FIG. 6.

FIG. 8 is a block diagram describing an example of a configuration of each apparatus included in the information processing system according to the present embodiment.

FIG. 9 is a diagram describing display control to darken a screen in a case where a user comes closer to a border in a first working example of the present embodiment.

FIG. 10 is a diagram describing display control to take a border away in a case where a user comes closer to the border in a second working example of the present embodiment.

FIG. 11 is a diagram describing a case where an expression method illustrated in FIG. 10 is achieved by moving an origin of the virtual space in a movement input direction of a user.

FIG. 12 is a diagram describing a case where the expression method illustrated in FIG. 10 is achieved by moving a viewpoint of the user in a direction opposite to the movement input direction of the user.

FIG. 13 is a graph illustrating a positional relationship between a user position in the real space and the user, a wall, and a virtual object in the virtual space in an example illustrated in FIG. 10.

FIG. 14 is a diagram describing display control to take a border away in a case where a user comes closer to a border in a third working example of the present embodiment.

FIG. 15 is a graph illustrating a positional relationship between a user position in the real space and the user and each object in the virtual space in an example illustrated in FIG. 14.

FIG. 16 is a flowchart illustrating an example of a flow of display control performed in an operational process of a system according to the present embodiment when a user comes closer to a border region.

FIG. 17 is a block diagram illustrating an example of a hardware configuration of an information processing apparatus according to the present embodiment.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs and redundant description thereof is thus omitted.

In addition, description is given in the following order.
1. Overview of Information Processing System according to Embodiment of the Present Disclosure
2. Configuration Example
3. Border Region Display Control
3-1. First Working Example
3-2. Second Working Example
3-3. Third Working Example
3-4. Supplemental Information
4. Operational Process
5. Hardware Configuration Example
6. Conclusion

1. OVERVIEW OF INFORMATION PROCESSING SYSTEM ACCORDING TO EMBODIMENT OF THE PRESENT DISCLOSURE

FIG. 1 is a diagram describing an overview of an information processing system according to an embodiment of the present disclosure. As illustrated in FIG. 1, a system 1 according to the present embodiment includes a display apparatus 10, a sensor apparatus 20, an information processing apparatus 30, and a content server 40. The display apparatus 10 presents an image of a virtual space to a user. The sensor apparatus 20 follows a motion of a user. The information processing apparatus 30 generates an image of a virtual space and performs display control on the display apparatus 10 for the image. The image is displayed on the display apparatus 10. The content server 40 stores content information of a virtual space.

The display apparatus 10 is achieved, for example, as HMD that is worn on the head of a user. The HMD includes, for example, respective image display units for left and right eyes, and is configured to control the visual sense and the auditory sense with a headphone. In addition, the HMD is also able to have left and right eyes see different videos and is able to present a 3D image by displaying images having a disparity for the left and right eyes. In addition, the display apparatus 10 may be a display such as a television apparatus, a smartphone, or a tablet terminal that is not worn.

The sensor apparatus 20 is an apparatus that senses a real space to recognize the position and posture of a user. For example, the sensor apparatus 20 includes an imaging unit and a sound pick-up unit.

The information processing apparatus 30 acquires content of a virtual space from the content server 40. In addition, the information processing apparatus 30 generates a free viewpoint image from the content in accordance with a motion of a user and provides the generated free viewpoint image to the display apparatus 10. The motion of a user includes the position and posture of the user. The information processing apparatus 30 follows the position and posture of a user on the basis of various kinds of sensing data obtained by sensing the user. For example, the information processing apparatus 30 may perform position tracking on the basis of sensing data acquired from the sensor apparatus 20 and perform head tracking and eye tracking on the basis of sensing data acquired from the display apparatus 10. A technique for causing the information processing apparatus 30 to perform a tracking process is described in the present embodiment, but the present disclosure is not limited to this technique. For example, the sensor apparatus 20 may be a follow-up apparatus having a position tracking function or the display apparatus 10 may be configured to also serve as a follow-up apparatus that performs the head tracking and the eye tracking.

Content of a virtual space to be provided to a user is omnidirectional content, free viewpoint content, game content, or the like. The free viewpoint content uses videos captured by a plurality of cameras to generate a video of a virtual camera placed at any position and allows the video to be viewed and listened to from every viewpoint. For example, 3D models of persons and objects acquired from a plurality of cameras are combined and complemented, thereby allowing for viewing from any viewpoint including an angle having no camera. The content includes recorded content and real-time content.

The term "virtual space" (or "VR space") used herein refers to a space that may be recognized by an actual user via one or more display apparatuses. In the virtual space, a user may influence an object in the virtual space via one or more user interfaces. The virtual space is simulated by one or more processors and may have an interacting rule including the physical law corresponding to the real space. The virtual space may be regarded as a type of expressions of a virtual working environment replaced with a real environment. The term "user interface" used herein refers to an actual device that allows a user to transmit an input or receive an output to or from the virtual world. In the virtual space, a user may be expressed as an avatar. Alternatively, no avatar is displayed on a display, but the world of a virtual space may be displayed from the viewpoint of an avatar. The viewpoint of a user (or avatar) in a virtual space herein may be regarded as a virtual camera's field of view. The "virtual camera" used herein refers to a viewpoint in a virtual space and is used for calculation for rendering a three-dimensional virtual space on a display (display apparatus) as a two-dimensional image.

The system 1 may further include a remote controller or game controller for transmitting an intention of a user to the system.

It is assumed that a user is able to move in a virtual space by performing the position tracking or using a remote controller. The position tracking allows a user moving forward, backward, left, or right in an actual space to also move forward, backward, left, or right in a virtual space in the movement amount. The user is thus able to enjoy a more immersive VR experience.

BACKGROUND

Here, content to be viewed and listened to by a user is considered to have a limited display region or allow a user to move within a restricted range. For example, this corresponds to a case where actually filmed free viewpoint content has no data for the outside of the display region (the movable region of the free viewpoint content is sometimes limited to a narrow range in general). In addition, this also corresponds to a case where it is not appropriate to get out of a room because content is CG content, but relates to the inside of a room.

Such an end of a display region or a termination of a virtual space fixed at a specific position in the virtual space is referred to as "border region" or simply as "border". FIG. 2 illustrates a diagram describing a border of a virtual space. As illustrated in FIG. 2, a virtual space has a region E1 in which a user is able to move and a region E2 in which a user is unable to move. The boundary therebetween serves as a border S. At this time, the position of the user in a real space is tracked by using the sensor apparatus 20 and the movement amount of the user in the real space is reflected in the movement amount in the virtual space. FIG. 3 is a graph illustrating the relationship between the movement amount of a user in a real space and the movement amount of the user in a virtual space. As illustrated in FIG. 3, a user position in a virtual space is proportional to the movement of a user position in a real space.

This allows the viewpoint of a user to even move beyond a border of a virtual space such as a wall. There have been two conventional approaches as expression methods for a case where a user collides with a wall of a virtual space. The first example is an expression method of having the viewpoint of a user penetrate a wall 41 in a virtual space in a case where the viewpoint of the user collides with the wall 41 as illustrated in FIG. 4. In this method, when the user attempts to move beyond the wall, the viewpoint of the user moves beyond the wall to render the virtual space black or render the virtual space as CG indicating the inside of the wall. The position of the wall 41 or virtual object 42 does not change in the virtual space. FIG. 5 is a graph illustrating the relationship between the movement amount of the user in the real space and the movement amount of the user in the virtual space in the example illustrated in FIG. 4. As illustrated in FIG. 5, when a user moves through a border such as a wall, the virtual space is rendered black or rendered as CG and the world ahead the wall is visible. This method does not allow a user to be strongly conscious of the presence of the border. In addition, this method has a problem that it is not possible to maintain the world view of the original content before the border.

In addition, another expression method is an expression method of preventing the viewpoint of a user from advancing beyond the wall 41 in the virtual space in a case where the user collides with the wall 41 as illustrated in FIG. 6. This method prevents the viewpoint of a user from moving beyond the wall in a virtual space even if the user is moving in a real space. In addition, the position of the wall 41 or virtual object 42 does not change in the virtual space. FIG. 7 is a graph illustrating the relationship between the movement amount of the user in the real space and the movement amount of the user in the virtual space in the example illustrated in FIG. 6. As illustrated in FIG. 6, even if a user arrives at a border such as a wall and the user further keeps on moving in a real space, the displayed position of the user does not change at all from the position of the wall. This method does not feed back the movement of the user after the collision to the user's field of view and may thus cause the user to recognize that the system is not correctly working. In addition, this method offers the same expression as an expression offered in a case where a user moves out of the tracking range. It is thus desirable to notify a user of feedback corresponding to the movement amount of the user in a real space while the system is correctly working even in a case the user arrives at an end of a movement region in a virtual space.

In this way, the conventional expression method deviates from the world view of the original content. This thus considerably breaks the world view and spoils a sense of immersion.

Accordingly, in the present embodiment, when a user comes closer to a border region and almost collided with a border in such restricted content, a specific expression is performed such as increasing the distance between the viewpoint of the user and the border region in the virtual space. This allows the user to recognize the border without breaking the world view of the virtual space.

The above has described the information processing system according to the embodiment of the present disclosure. Next, a specific configuration of each apparatus included in the information processing system according to the present embodiment is described with reference to the drawings.

2. CONFIGURATION EXAMPLE

FIG. 8 is a block diagram describing an example of a configuration of each apparatus included in the information processing system according to the present embodiment.
(Display Apparatus 10)

As illustrated in FIG. 8, the display apparatus 10 includes a control unit 11, a light emitting unit 12, a display unit 13, a speaker 14, a sensor unit 15, and a communication unit 16.

The display apparatus 10 is worn and used on the head of a user observing, for example, a displayed image. The display apparatus 10 transmits information sensed by the sensor unit 15 to the information processing apparatus 30 in predetermined cycles.

The control unit 11 functions as an arithmetic processing device and a control device and controls the overall operation of the display apparatus 10 in accordance with a variety of programs. The control unit 11 is achieved, for example, as an electronic circuit such as CPU (Central Processing Unit) or a microprocessor. In addition, the control unit 11 may include ROM (Read Only Memory) that stores a program, an arithmetic parameter, and the like to be used and RAM (Random Access Memory) that temporarily stores a parameter and the like that appropriately change.

The light emitting unit 12 includes, for example, one or more LED lights, an infrared light emitting unit, or the like. The light emitting unit 12 is used to perform outside-in position tracking that recognizes the position of the display apparatus 10 by using an external camera.

In a case where the display apparatus 10 is configured as HMD, the display unit 13 includes left and right screens respectively fixed at the left and right eyes of a user and displays an image for the left eye and an image for the right eye. The screen of the display unit 13 includes, for example, a display panel such as a liquid crystal display (LCD: Liquid Crystal Display) or an organic EL (Electro Luminescence) display or a laser scanning display such as a retina direct display. In addition, the display unit 13 includes an image forming optical system that enlarges and projects a display screen and forms an enlarged virtual image on a pupil of a user. The enlarged virtual image has a predetermined viewing angle.

In a case where the display apparatus 10 is configured as HMD, the speaker 14 is configured as a headphone worn on the head of a user and reproduces an audio signal. It is to be noted that the speaker 14 is not limited to a headphone type, but may be configured as an earphone or a bone-conductive speaker.

The sensor unit 15 includes, for example, a motion sensor including a combination of a plurality of sensors such as a gyro sensor, an acceleration sensor, and a geomagnetic sensor. The sensor unit 15 may be a sensor that is able to detect, for example, nine axes in total: a triaxial gyro sensor; triaxial acceleration sensor; and triaxial geomagnetic sensor. Alternatively, the sensor unit 15 may be at least any of a gyro sensor, an acceleration sensor, or a geomagnetic sensor. Data sensed by the sensor unit 15 is regularly transmitted by the control unit 11 from the communication unit 16 to the information processing apparatus 30 and used to calculate the posture of the head of a user wearing the display apparatus 10.

In addition, the sensor unit 15 may include a line-of-sight detection sensor that detects a user's line of sight who is wearing the display apparatus 10. For example, the line-of-sight detection sensor may be an inward camera such as an infrared sensor (infrared light emitting unit and infrared camera) provided around the display unit 13 positioned in front of the eyes of a user, a myoelectric sensor that senses a motion of the surrounding muscles of the eyes of a user, a brain wave sensor, or the like.

The communication unit 16 is coupled to the information processing apparatus 30 in a wired or wireless manner and transmits and receives data. For example, the communication unit 16 establishes communication coupling to the information processing apparatus 30 by wired/wireless LAN (Local Area Network), Wi-Fi (registered trademark), Bluetooth (registered trademark), or the like.

The above has specifically described the configuration of the display apparatus 10, but the configuration of the display apparatus 10 according to the present disclosure is not limited to the example illustrated in FIG. 8. For example, in a case where the display apparatus 10 is configured as HMD, a microphone may be further provided that acquires a user sound. In addition, in a case where the display apparatus 10 is configured as HMD, an outward camera may be further provided that is used to perform inside-out position tracking.

(Sensor Apparatus 20)

The sensor apparatus 20 includes a control unit 21, an imaging unit 22, a sound pick-up unit 23, and a communication unit 24. The sensor apparatus 20 is an external sensor installed around a user and a plurality of external sensors may be provided.

The control unit 21 functions as an arithmetic processing device and a control device and controls the overall operation of the sensor apparatus 20 in accordance with a variety of programs. The control unit 21 is achieved, for example, as an electronic circuit such as CPU (Central Processing Unit) or a microprocessor. In addition, the control unit 21 may include ROM (Read Only Memory) that stores a program, an arithmetic parameter, and the like to be used and RAM (Random Access Memory) that temporarily stores a parameter and the like that appropriately change.

The imaging unit 22 is a camera that images light of an LED light or infrared light emitting unit provided to the display apparatus 10 (HMD) worn by a user. Captured images acquired by the imaging unit 22 are regularly transmitted to the information processing apparatus 30 and used to calculate (outside-in position tracking) the position of a user and the user's line of sight. A plurality of the imaging units 22 may be provided.

The sound pick-up unit 23 picks up a user sound and a surrounding environmental sound to output an audio signal to the control unit 21. The control unit 21 may extract a predetermined command by analyzing a picked-up sound and perform control such as powering on/off the sensor apparatus 20. In addition, the picked-up sound may be transmitted to the information processing apparatus 30 and subjected to sound analysis in the information processing apparatus 30 to extract a predetermined command. Alternatively, the picked-up sound may be transmitted to a communication partner via a virtual space. A plurality of the sound pick-up units 23 may be provided.

The communication unit 24 is coupled to the information processing apparatus 30 in a wired or wireless manner and transmits and receives data. For example, the communication unit 24 establishes communication coupling to the information processing apparatus 30 by wired/wireless LAN (Local Area Network), Wi-Fi (registered trademark), Bluetooth (registered trademark), or the like.

The above has specifically described the configuration of the sensor apparatus 20, but the configuration of the sensor apparatus 20 according to the present disclosure is not limited to the example illustrated in FIG. 8. For example, the sensor apparatus 20 does not have to include the sound pick-up unit 23, but may include a plurality of devices.

(Information Processing Apparatus 30)

The information processing apparatus 30 includes a control unit 31, a communication unit 32, and a storage unit 33. The information processing apparatus 30 has a rendering process function of generating an image of a virtual space to be outputted to the display apparatus 10. In addition, in a case where the display apparatus 10 is configured as HMD, the information processing apparatus 30 performs a rendering process of changing an image of a virtual space viewed by a user wearing the display apparatus 10 in accordance with the position and posture of the user.

The control unit 31 functions as an arithmetic processing device and a control device and controls the overall operation of the information processing apparatus 30 in accordance with a variety of programs. The control unit 31 is achieved, for example, as an electronic circuit such as CPU (Central Processing Unit) or a microprocessor. In addition, the control unit 31 may include ROM (Read Only Memory) that stores a program, an arithmetic parameter, and the like to be used and RAM (Random Access Memory) that temporarily stores a parameter and the like that appropriately change.

In addition, the control unit 31 also functions as a tracking section 311 and a rendering process section 312. The tracking section 311 may perform tracking related to a motion of a user such as following (head tracking) the head of the user, following (eye tracking) the user's line of sight, and following (position tracking) the position or posture of the user.

For example, the tracking section 311 is able to perform so-called head tracking of calculating posture information of a portion such as the head of a user to which the display apparatus 10 is attached on the basis of a detection result of the nine axes detected by the sensor unit 15 of the display apparatus 10.

In addition, the tracking section 311 is able to perform so-called eye tracking of calculating a user's line of sight (line-of-sight direction and gaze point) on the basis of captured images (e.g., infrared images obtained by emitting infrared rays to the eyes and imaging the reflection) of the eyes of the user detected by the sensor unit 15 of the display apparatus 10.

In addition, in a case where the display apparatus 10 is configured as HMD, the tracking section 311 is able to perform so-called position tracking of detecting the position and posture of a user wearing the display apparatus 10. The position tracking includes outside-in position tracking that uses a sensor installed outside, inside-out position tracking that uses a sensor mounted on an object (HMD) desired to be measured, and hybrid position tracking that is a combination thereof.

In the outside-in position tracking, for example, the positions of a plurality of LED lights (markers) provided to HMD are imaged and acquired by a camera (sensor apparatus 20) installed outside. The position and the posture are calculated on the basis of a change in the acquired positional information of the LED lights. It is to be noted that the tracking section 311 is also able to calculate a user posture including the posture of the head of a user on the basis of a change in the positional information of the LED lights and data of a motion sensor provided to the HMD.

In the inside-out position tracking, the position and posture of a user are calculated on the basis of information acquired by a motion sensor, depth sensor, and outward camera provided to HMD. For example, it is possible to acquire the positional information of a user by imaging the outside world by using an outward camera provided to HMD and comparing the imaged outside world and a space map generated in advance by the SLAM (Simultaneous Localization and Mapping) technology. Alternatively, it is possible to calculate the posture of a user along with information of a motion sensor or a depth sensor. In this case, no external sensor is necessary and the sensor apparatus 20 does not thus have to be installed.

The rendering process section 312 generates a free viewpoint image of a virtual space that corresponds to a motion (position and posture) of a user on the basis of a tracking result of the tracking section 311 and transmits the generated free viewpoint image from the communication unit 32 to the display apparatus 10. This causes the free viewpoint image of the virtual space to be presented to the user. The free viewpoint image changes in real time, following the position movement of the user, the direction or inclination of the face, or the like. The user is thus able to freely move and look around in every direction in the virtual space.

In addition, in a case where a user comes closer to a border region in a virtual space, the rendering process section 312 according to the present embodiment causes the user to recognize the border of the virtual space without breaking the world view of the virtual space under predetermined display control in which distance control is reflected such as increasing the distance between the viewpoint of the user and the border region in the virtual space. The details of the predetermined display control performed in a case where a user comes closer to a border of a virtual space are described below with reference to FIG. 9 to FIG. 15.

The communication unit 32 is coupled to the display apparatus 10 and the sensor apparatus 20 in a wired or wireless manner to transmit and receive data. For example, the communication unit 32 establishes communication coupling to the display apparatus 10 and the sensor apparatus 20 by wired/wireless LAN (Local Area Network), Wi-Fi (registered trademark), Bluetooth (registered trademark), or the like.

In addition, the storage unit 33 is achieved as ROM (Read Only Memory) that stores a program, an arithmetic parameter, and the like to be used for the processes of the control unit 31 and RAM (Random Access Memory) that temporarily stores a parameter and the like that appropriately change. In addition, the storage unit 33 may accumulate content of a virtual space acquired from the content server 40 illustrated in FIG. 1.

The above has specifically described the configuration of the information processing apparatus 30, but the configuration of the information processing apparatus 30 according to the present disclosure is not limited to the example illustrated in FIG. 8. For example, the information processing apparatus 30 may be integrated with the display apparatus 10 or include the sensor apparatus 20. Alternatively, the information processing apparatus 30 may include a plurality of devices. For example, the tracking process may be performed by a different apparatus. Specifically, the sensor apparatus 20 may perform the position tracking or the display apparatus 10 may perform the head tracking, the eye tracking, and the position tracking.

In addition, the information processing apparatus 30 may include a server provided in a network or include a dedicated terminal disposed in the same space as the space of a user. Alternatively, the information processing apparatus 30 may include a smartphone, a tablet terminal, PC, or the like.

The above has specifically described the configuration of the system 1 according to the present embodiment. It is to be noted that the configuration of the system 1 illustrated in FIG. 8 is an example, but the present embodiment is not limited to this. For example, the sensor apparatus 20 does not have to be included.

3. BORDER REGION DISPLAY CONTROL

Next, border region display control according to the present embodiment is specifically described with reference to FIG. 9 to FIG. 15.

<3-1. First Working Example>

FIG. 9 is a diagram describing display control to darken the screen in a case where a user comes closer to a border in a first working example. As illustrated in FIG. 9, in a case where a user comes closer to the wall 41 that is a border region in a virtual space, the information processing apparatus 30 applies an effect of darkening or blurring the screen to make the originally visible screen difficult to view (lower the visual recognizability). This allows the user to naturally recognize that the direction in which the user comes closer is a termination of the virtual space and is a direction in which the user should not advance. It is to be noted that "coming closer to a border (or the wall 41 that is an example of a border region)" herein means that the border and a user position (user viewpoint) in the virtual space falls within a certain distance.

It is to be noted that the effect of darkening the screen does not have to be uniformly applied to the screen, but may be applied as appropriate in accordance with the distance from the wall 41. That is, the screen may be darkened more with a decrease in the distance from the wall 41 and the screen may be blacked out in the end. In addition, the effect of darkening the screen is not uniformly applied in accordance with the position of a user, but may be applied by taking into consideration the direction of the user and the advancing direction. For example, the effect of darkening the screen is not applied in a case were the direction of the face of a user is opposite to a border in spite of the presence of the user near the border. Alternatively, in a case where the direction of the face of a user is parallel to a border, the effect may be more strongly applied to the user's field of view closer to the border and the effect may be prevented from being applied to the farthest side from the border. In addition, in a case where a user faces a border, the effect is applied to the user's entire field of view. In addition, in a case where a user is moving, it may be dynamically changed in accordance with the distance or direction of the user to a border to what degree the effect may be applied. In a case where a user goes a certain distance away from a border, the effect is not applied whichever direction the user faces.

The first working example described above may be combined with the conventional expression method described with reference to FIG. 6. That is, in a case where a user keeps on moving toward a border even after being blocked by the border, the position of the user in the virtual space does not change, but the effect may be presented of darkening the screen in accordance with the moving speed of the user. This allows the system to provide the user with feedback indicating that the system understands the movement of the user.

<3-2. Second Working Example>

FIG. 10 is a diagram describing display control to take a border away in a case where a user comes closer to the border in a second working example. For example, in a case where a user comes closer to the wall 41 that is a border and comes within a certain distance as illustrated on the left in FIG. 10, the information processing apparatus 30 performs display control to take the wall 41 away from the user or increase the distance between the viewpoint of the user and the border region as illustrated in the middle of FIG. 10.

As long as the user moves toward the border, this display control continues. Even if the user further moves toward the wall 41, the wall 41 is taken further away as illustrated on the right in FIG. 10. The user is not thus able to pass through the wall 41. In this way, taking the wall 41 away to prevent the user from coming closer to the wall 41 even if the user comes closer allows the user to recognize that the wall 41 is a border of the virtual space, but not the direction in which the user should advance without spoiling the world view of the virtual space.

It is to be noted that the wall 41 serving as a border and the virtual object 42 are considered to have fixed relative positions from the origin in the virtual world. The information processing apparatus 30 is thus able to achieve the expression method (display control to take the wall 41 away) illustrated in FIG. 10 by moving the entire virtual space in the same direction as a movement input direction that is the direction in which a user comes closer to the wall 41 in accordance with the movement input direction of the user, for example, as illustrated in FIG. 11.

Alternatively, it is also possible to achieve the expression method (display control to take the wall 41 away) illustrated in FIG. 10 with the relative positions of the wall 41 serving as a border and the virtual object 42 from the origin fixed in the virtual world by moving the viewpoint of a user in the direction opposite to a movement input direction that is the direction in which the user comes closer to the wall 41 as illustrated in FIG. 12.

In addition, the information processing apparatus 30 applies a bounce effect while performing the distance control to increase the distance between the user and the wall 41. This more effectively allows a user to recognize a border of a virtual space when the user comes closer to the wall 41. As the bounce effect, the information processing apparatus 30 repeats lengthening and shortening the relative distance between the viewpoint of the user and the wall 41. That is, the information processing apparatus 30 does not change the movement amount (movement amount of the viewpoint of a user) of a free viewpoint image of a virtual space that is displayed in the user's field of view to make the movement amount proportional to the actual movement amount of the user in the real space, but changes the movement amount to cause the movement amount to have a specific curve as illustrated in FIG. 13. This display control allows the information processing apparatus 30 to take the wall 41 away while keeping feedback indicating that the user is moving. As a specific example, for example, a case is described where a user comes closer to a border at constant speed with reference to FIG. 13.

FIG. 13 is a graph illustrating the positional relationship between a user position in the real space and the user, a wall, and a virtual object in the virtual space in the present working example. As illustrated in FIG. 13, for example, in a case where a user comes closer to the wall 41 that is a border at constant speed, the position of the wall 41 or virtual object 42 is not changed at first. This causes it to look like the position (viewpoint) of the user moves in the virtual space at the same speed as the actual movement amount. The position of the wall 41 is then temporarily taken away from the user (e.g., the viewpoint of the user is moved a little in the virtual space in the direction opposite to that of the actual motion) when the position of the user comes a certain distance closer to the border. In a case where the user further keeps on moving in the actual space in the border direction at constant speed, the information processing apparatus 30 repeats a motion of taking the position of the wall 41 away from the user in the user's field of view and a motion of bringing the position of the wall 41 closer to the user in the user's field of view (bounce effect). At this time, the wall 41 and the virtual object 42 each have a fixed relative distance from the origin in the virtual space and thus the position of another object such as the virtual object 42 is also moved as with the wall 41. In addition, the motion of taking the border away may be sufficiently short (fast) as compared with the motion of bringing the border closer. In addition, the bounce effect of the border may be stopped at the same time that the user stops. Alternatively, a physical action of an elastic object in the real space may be reproduced by continuing the bounce effect for a predetermined time after the user stops and then returning the wall 41 to the original state (original position). In this case, whatever action the user makes, the wall 41 is restored over time to the state before the bounce effect is applied.

This causes the user to feel as if the repulsive force worked to prevent the user from coming closer to a border when the user comes closer to the border. Conversely, in a case where the user goes away from the border, the movement amount in the virtual space is made the same as the actual movement amount. This allows the system to cause the user to recognize a border of the virtual space and present only content within the range to the user without spoiling the world view while providing the user feedback indicating that the system correctly recognizes the movement of the user. It is to be noted that the information processing apparatus 30 may present (strongly) the bounce effect according to the present working example from a greater distance as the user approaches the wall 41 (border) at higher speed. In addition, the information processing apparatus 30 may change it in accordance with the speed of approaching the wall 41 to what degree the bounce effect is applied (e.g., depth of bouncing or the like). In addition, the information processing apparatus 30 may change the degree of bouncing in accordance with a wall material of the wall 41.

<3-3. Third Working Example>

FIG. 14 is a diagram describing display control to take a border away in a case where a user comes closer to the border in a third working example. For example, in a case where a user comes closer to the wall 41 that is a border and comes within a certain distance as illustrated on the left in FIG. 14, the information processing apparatus 30 performs display control to add an effect of transforming the space while performing the distance control to take the wall 41 away from the user or increase the distance between the viewpoint of the user and the border region as illustrated in the middle of FIG. 14. As long as the user moves toward the border, this display control continues. Even if the user further moves toward the wall 41, the wall 41 is taken further away as illustrated on the right in FIG. 14. The user is not thus able to pass through the wall 41. This display control to take the wall 41 away is similar to that of the second working example. In the working example, however, when a user comes closer to the wall 41, the effect of transforming the space is given. This makes it possible to present only content within the range while providing the user with movement feedback.

For example, the information processing apparatus 30 may apply an effect of expanding and shrinking the space such as extending and absorbing (undoing) the portion around the wall 41. As a user's field of view, display control is repeated to take the wall 41 away while horizontally extending the screen for an instant and then undoing the screen when the user comes closer to the wall 41. This prevents the user from passing through the wall 41 even if the user keeps on moving to the wall 41. It is to be noted that, in a case where there is another object such as the virtual object 42 in a nearby area, the object may be transformed as with the wall 41. Alternatively, if a virtual object is eye-catching such as a person, a character, a message, or UI, the virtual object may maintain the original aspect ratio with no transformation.

FIG. 15 is a graph illustrating the positional relationship between a user position in the real space and the user, a wall, and a virtual object in the virtual space in the present working example. As illustrated in FIG. 15, for example, in a case where a user is coming closer to the wall 41 at constant speed, the information processing apparatus 30 does not change the position of the wall 41 or virtual object 42 at first. This causes it to look like the position (viewpoint) of the user moves in the virtual space at the same speed as the actual movement amount. The information processing apparatus 30 then temporarily takes the position of the wall 41 away from the user when the position of the user comes a certain distance closer to the border. In a case where the user keeps on moving in the actual space in the border direction at constant speed, the information processing apparatus 30 repeats a motion of taking the position of the wall 41 away from the user in the user's field of view and a motion of bringing the position of the wall 41 closer to the user in the user's field of view (as in the second working example). In this case, in the present working example, the information processing apparatus 30 applies an effect of temporarily transforming the space such as extending and undoing the wall 41. In addition, the wall 41 and the virtual object 42 are each considered to have a fixed relative distance from the origin in the virtual space. Accordingly, the information processing apparatus 30 takes the wall 41 away and also moves the position of the virtual object 42 as illustrated in FIG. 15.

<3-4. Supplemental Information>

The above has described the first to third working examples, and they may be combined as appropriate. For example, when a user comes closer to the wall 41, the screen may be darkened a little to be difficult to view while the motion of taking the wall 41 away from the user and the motion of bringing the wall 41 closer to the user may be repeated. In addition, in the present embodiment, the wall 41 is used as an expression of a border of a virtual space, but the present disclosure is not limited thereto. Another virtual object, for example, a forest, a beach, a cliff, a building, a fence, or the like may be used.

In addition, in the above-described first to third working examples, the example is used in which a user actually moves in a real space chiefly by the position tracking, but the present embodiment is not limited thereto. It is also possible to apply a similar expression in a case where a user uses a remote controller to move in a virtual space. In addition, the actual movement amount of movement by the position tracking sometimes corresponds to the movement amount in the virtual space at a certain ratio. For example, it is assumed that, when a user moves 30 cm in the real world, the user may accordingly move twice as much or 60 cm in the virtual space. Even in this case, it is possible to similarly apply the effects according to the above-described first to third working examples that are multiplied by certain magnification.

In addition, the information processing apparatus 30 may output some effect sounds (such as a collision sound) or vibration when a user comes closer to a border. In addition, the information processing apparatus 30 may present a 3D audio collision sound indicating which side of the user collides. This allows the user to recognize collision, for example, even in a case where a blind portion of the user such as the back collides with the wall 41 or the like. In addition, the information processing apparatus 30 may present the effect sound corresponding to bouncing without making the collision sound when a user slowly comes closer to the wall (border).

In addition, as a specific service to which the present embodiment is applied, a game is first conceivable such as RPG (Role Playing Game) in which the virtual space is moved by a controller or the position tracking. Such a game uses a wall or the like in many cases to limit the range within which a user is able to move. The user has to move while being constantly conscious of the border. The present embodiment, however, makes it possible to make the user conscious of the border without presenting a video of the outside of the border (without spoiling the world view).

In addition, the present embodiment may be applied to content such as watching sports, walking in the city, or viewing the property by using an actually filmed free viewpoint image. These pieces of content do not have videos actually captured for the outside of borders and it is not thus possible in principle to create the videos. If those portions are rendered as CG, a sense of reality or the world view is spoiled. Applying the present embodiment, however, makes it possible to avoid such a situation. Alternatively, the present embodiment is applicable to a game or content that a user enjoys in the amusement facility or the like with a VR headset on because it is necessary to warn the user that the user approaches a border. Especially the effect according to the first embodiment is appropriate.

The present embodiment is not limited to a border, but is also applicable to a motion of invading the respective personal spaces of a user and another user in a case where the other user is displayed for communication in a virtual space as an avatar. In this case, for example, when a user A comes too close to a user B (invades a predetermined surrounding range of the user B), the user A is rebounded by the user B and is able to move in the virtual space only in a smaller movement amount than the actual movement amount. This allows comfortable communication to be enjoyed by keeping each personal space without causing contradicting expressions in the space.

In addition, in the above-described embodiment, the technique has been described for causing a user to recognize a border in a virtual space, but this may be applied to AR (Augmented Reality). Specifically, the information processing apparatus 30 may perform display control to cause a user to recognize an obstacle or a dangerous direction in a real space. For example, when a user almost collided with a real object (in a case where a user comes closer to a real object), a specific effect may be explicitly expressed or the dangerous direction may be displayed and presented as AR. As an apparatus component that provides this AR display, a variety of terminals (mobile terminals) may be used as appropriate such as optical see-through HMD and a smartphone that is able to perform video see-through AR display.

4. OPERATIONAL PROCESS

Next, an operational process of the information processing system according to the present embodiment is specifically described with reference to FIG. 16. FIG. 16 is a flowchart illustrating an example of the flow of display control performed in the operational process of the system according to the present embodiment when a user comes closer to a border region.

As illustrated in FIG. 16, when a user first comes closer within a certain distance to a border (wall) (step S103), the information processing apparatus 30 presents an effect to the user (step S106). The effect includes the video effects according to the above-described first to third working examples. More specifically, the effect is darkening, blurring, bouncing, space transforming, or the like. The case has been described as an example where the position (viewpoint) of a user in a virtual space comes closer within a certain distance from a border to trigger the effect, but the present embodiment is not limited thereto. For example, a user is moving toward a border. In this case, the effect may be presented in a case where it is possible to predict that the user arrives at the border within a certain time if the user is moving at the current speed or in a case where the user comes closer to the border at speed greater than or equal to a predetermined value. In contrast, there is sometimes a region inside the border such as a door or a passage that allows a user to normally move. It is also possible to refrain from applying the effect in a case where the user comes closer to that region.

Next, in a case where the user stops moving toward the wall (border) (e.g., in a case where the user stops, changes the direction, or moves a predetermined distance away from the wall) (step S109/Yes), the information processing apparatus 30 finishes presenting the effect (step S112). That is, the information processing apparatus 30 stops the control to increase the distance between the user and the wall, for example.

In contrast, in a case where the user does not stop moving toward the wall (border) (step S109/No), the information processing apparatus 30 continues presenting the effect (step S115).

The above has described the example of the operational process according to the present embodiment. It is to be noted that the operational process illustrated in FIG. 16 is an example. The present disclosure is not limited to the example illustrated in FIG. 16. For example, the present disclosure is not limited to the order of steps illustrated in FIG. 16. At least any of the steps may be processed in parallel or processed in the reverse order. In addition, not all the processes illustrated in FIG. 16 necessarily have to be executed. Not all the processes illustrated in FIG. 16 necessarily have to be performed by a single apparatus.

For example, a process of presenting an effect as appropriate in accordance with the movement of a user may be performed such as presenting the effect according to the second or third working example in a case where the user approaches within a certain distance to a border and adding the effect according to the first working example in a case where the user further approaches the border.

5. HARDWARE CONFIGURATION EXAMPLE

Finally, a hardware configuration of the information processing apparatus according to the present embodiment is described with reference to FIG. 17. FIG. 17 is a block diagram illustrating an example of a hardware configuration of the information processing apparatus 30 according to the present embodiment. It is to be noted that an information processing apparatus 800 illustrated in FIG. 17 may achieve the information processing apparatus 30 illustrated in FIG. 8, for example. Information processing by the information processing apparatus 30 according to the present embodiment is achieved in cooperation between software and hardware described below.

As illustrated in FIG. 17, the information processing apparatus 800 includes, for example, CPU 871, ROM 872, RAM 873, a host bus 874, a bridge 875, an external bus 876, an interface 877, an input device 878, an output device 879, a storage 880, a drive 881, a coupling port 882, and a communication device 883. It is to be noted that the hardware configuration illustrated here is an example and a portion of the components may be omitted. In addition, a component other than the components illustrated here may be further included.

(CPU 871)

The CPU 871 functions, for example, as an arithmetic processing device or a control device and controls the overall operation of each component or a portion thereof on the basis of a variety of programs recorded in the ROM 872, the RAM 873, the storage 880, or a removable recording medium 901.

Specifically, the CPU 871 achieves the operation of the control unit 31 in the information processing apparatus 30.

(ROM 872 and RAM 873)

The ROM 872 is means for storing a program to be read by the CPU 871, data to be used for calculation, or the like. The RAM 873 temporarily or permanently stores, for example, a program to be read by the CPU 871, a variety of parameters appropriately changing in executing the program, or the like.

(Host Bus 874, Bridge 875, External Bus 876, and Interface 877)

The CPU 871, the ROM 872, and the RAM 873 are coupled to each other, for example, via the host bus 874 that is able to transmit data at high speed. Meanwhile, the host bus 874 is coupled to the external bus 876 having a relatively low data transmission rate, for example, via the bridge 875. In addition, the external bus 876 is coupled to a variety of components via the interface 877.

(Input Device 878)

For example, a mouse, a keyboard, a touch panel, a button, a switch, a lever, and the like are used for the input device 878. Further, as the input device 878, a remote controller (referred to as remote control below) is sometimes used that is able to transmit a control signal by using infrared rays or other radio waves. In addition, the input device 878 includes an audio input device such as a microphone.

(Output Device 879)

The output device 879 is a device that is able to visually or aurally notify a user of acquired information. Examples of the device include a display device such as CRT (Cathode Ray Tube), LCD, or organic EL, an audio output device such as a speaker or a headphone, a printer, a mobile phone, a facsimile, or the like. In addition, the output device 879 according to the present disclosure includes a variety of vibration devices that are able to output tactile stimulation.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads out information recorded in the removable recording medium 901 such as a magnetic disk, an optical disc, a magneto-optical disk, or a semiconductor memory or writes information to the removable recording medium 901.

(Removable Recording Medium 901)

The removable recording medium 901 includes, for example, a DVD medium, a Blu-ray (registered trademark) medium, an HD DVD medium, a variety of semiconductor storage media, and the like. Needless to say, the removable recording medium 901 may be, for example, an IC card, an electronic device, or the like each of which is mounted with a contactless IC chip.

(Coupling Port 882)

The coupling port 882 is, for example, a port such as a USB (Universal Serial Bus) port, an IEEE 1394 port, SCSI (Small Computer System Interface), an RS-232C port, or an optical audio terminal for coupling an external coupling apparatus 902.

(External Coupling Apparatus 902)

The external coupling apparatus 902 is, for example, a printer, a portable music player, a digital camera, a digital video camera, an IC recorder, or the like. Alternatively, the external coupling apparatus 902 may include the display apparatus 10 and sensor apparatus 20 illustrated in FIG. 8.

(Communication Device 883)

The communication device 883 is a communication device for coupling to a network. For example, the communication device 883 is a communication card for wired or wireless LAN, Wi-Fi (registered trademark), Bluetooth (registered trademark), or WUSB (Wireless USB), a router for optical communication, a router for ADSL (Asymmetric Digital Subscriber Line), a modem for various kinds of communication, or the like. The communication device 883 may couple the display apparatus 10 and sensor apparatus 20 illustrated in FIG. 8.

6. CONCLUSION

As described above, the information processing system according to the embodiment of the present disclosure allows a user to recognize a border of a virtual space without breaking the world view of a virtual space.

Specifically, according to the present embodiment, in a case where a user in a virtual space attempts to move outside a border of the virtual space, an expression such as darkening or blurring the screen makes the user conscious of the presence of the border to deter the user from making an action of going beyond the border.

In addition, according to the present embodiment, even in a case where a user attempts to move beyond a border, it is possible to cause the user to recognize the presence of the border without breaking the world view by hiding a video of the outside of the border while causing the user to recognize that the system receives a motion of the user by making the user bound at the border or extending and undoing the space.

In addition, according to the present embodiment, applying a similar effect to a collision in a system in which an avatar of another user is displayed allows comfortable communication to be performed while maintaining the distance that each user wishes to keep.

Although the above has described the preferred embodiment of the present disclosure in detail with reference to the attached drawings, the present technology is not limited to such examples. It is apparent that a person having ordinary skill in the art of the present disclosure may arrive at various alterations and modifications within the scope of the technical idea described in the appended claims and it is understood that such alterations and modifications naturally fall within the technical scope of the present disclosure.

For example, it is also possible to create a computer program for causing hardware such as CPUs, ROMs, and RAMs built in the above-described display apparatus 10, sensor apparatus 20, and information processing apparatus 30 to exhibit the functions of the display apparatus 10, sensor apparatus 20, and information processing apparatus 30. In addition, there is also provided a computer-readable storage medium in which the computer program is stored.

In addition, the effects described herein are merely illustrative and exemplary, but not limitative. That is, the technology according to the present disclosure may exert other effects that are apparent to those skilled in the art from the description herein in addition to the above-described effects or in place of the above-described effects.

It is to be noted that the present technology is also able to adopt the following configurations.

(1)

An information processing apparatus including
a control unit that
tracks a motion of a user to present an image of a virtual space to the user, and
performs distance control to increase a distance between a viewpoint of the user and a border region in the virtual space while an operation of the user coming closer toward the border region is being inputted, the border region being fixed at a specific position in the virtual space.

(2)

The information processing apparatus according to (1), in which the control unit stops the control to increase the distance in a case where inputting the operation of coming closer toward the border region is finished.

(3)

The information processing apparatus according to (1) or (2), in which the control unit starts the control to increase the distance in a case where the viewpoint of the user comes within a certain distance from the border region.

(4)

The information processing apparatus according to any one of (1) to (3), in which, while performing the distance control, the control unit adds a bounce effect to generate the image.

(5)

The information processing apparatus according to any one of (1) to (3), in which, while performing the distance control, the control unit adds a space transforming effect to generate the image.

(6)

The information processing apparatus according to (4) or (5), in which the control unit increases the distance between the viewpoint of the user and the border region in the distance control by moving an origin in the virtual space in a same direction as a movement direction of the user.

(7)

The information processing apparatus according to (4) or (5), in which the control unit increases the distance between the viewpoint of the user and the border region by moving the viewpoint of the user in a direction opposite to a movement direction of the user.

(8)

The information processing apparatus according to any one of (1) to (7), in which the control unit adds an effect of lowering visual recognizability to generate the image in a case where the viewpoint of the user comes within a certain distance from the border region.

(9)

The information processing apparatus according to any one of (1) to (8), in which
the control unit
recognizes a position and a posture of the user as the motion of the user, and
generates a free viewpoint image as the image of the virtual space, the free viewpoint image being based on the position and the posture of the user.

(10)

An information processing method including, by a processor:
tracking a motion of a user to present an image of a virtual space to the user; and
performing distance control to increase a distance between a viewpoint of the user and a border region in the virtual space while an operation of the user coming closer toward the border region is being inputted, the border region being fixed at a specific position in the virtual space.

(11)

A recording medium having a program recorded therein, the program causing a computer to function as
a control unit that
tracks a motion of a user to present an image of a virtual space to the user, and
performs distance control to increase a distance between a viewpoint of the user and a border region in the virtual space while an operation of the user coming closer toward the border region is being inputted, the border region being fixed at a specific position in the virtual space.

REFERENCE SIGNS LIST 1 system
10 display apparatus
11 control unit
12 light emitting unit
13 display unit
14 speaker
15 sensor unit
16 communication unit
20 sensor apparatus
21 control unit
22 imaging unit
23 sound pick-up unit
24 communication unit
30 information processing apparatus
31 control unit
311 tracking section
312 rendering process section
32 communication unit
33 storage unit
40 content server
41 wall
42 virtual object

The invention claimed is:

1. An information processing apparatus, comprising
a memory configured to store instructions; and
a central processing unit (CPU) configured to execute the instructions stored in the memory to:
track a motion of a user to present an image of a virtual space to the user,
perform, based on movement of an origin in the virtual space in a same direction as a movement direction of the user, distance control to increase a distance between a viewpoint of the user and a border region in the virtual space while an operation of the user that comes closer toward the border region is being inputted, wherein
the border region is at a specific position in the virtual space;
control presentation of one of a bounce effect or a space transforming effect in the image of the virtual space based on the distance control;

determine whether the motion of the user toward the border region of the virtual space has stopped;

stop, based on the determination that the motion of the user toward the border region has stopped, the presentation of the one of the bounce effect or the space transforming effect; and continue, based on the determination that the motion of the user toward the border region has not stopped, the presentation of the one of the bounce effect or the space transforming effect.

2. The information processing apparatus according to claim 1, wherein the CPU is further configured to stop the distance control to increase the distance based on the operation of the user that comes closer towards the border region is finished.

3. The information processing apparatus according to claim 1, wherein the CPU is further configured to increase the distance between the viewpoint of the user and the border region based on movement of the viewpoint of the user in a direction opposite to the movement direction of the user.

4. The information processing apparatus according to claim 1, wherein the CPU is further configured to add an effect of lowering visual recognizability of the virtual space to generate the image based on the viewpoint of the user is within a specific distance from the border region.

5. The information processing apparatus according to claim 1, wherein the CPU is further configured to:

recognize a position and a posture of the user as the motion of the user; and generate a free viewpoint image as the image of the virtual space, wherein the free viewpoint image is based on the position and the posture of the user.

6. An information processing method, comprising:

in an information processing apparatus:

storing, by a memory of the information processing apparatus, instructions;

executing, by a processor of the information processing apparatus, the instructions stored in the memory;

tracking, by the processor, a motion of a user to present an image of a virtual space to the user;

performing, by the processor based on movement of an origin in the virtual space in a same direction as a movement direction of the user, distance control to increase a distance between a viewpoint of the user and a border region in the virtual space while an operation of the user that comes closer toward the border region is being inputted, wherein the border region is at a specific position in the virtual space;

controlling, by the processor, presentation of one of a bounce effect or a space transforming effect in the image of the virtual space based on the distance control;

determining, by the processor, whether the motion of the user toward the border region of the virtual space has stopped;

stopping, by the processor based on the determination that the motion of the user toward the border region has stopped, the presentation of the one of the bounce effect or the space transforming effect; and continuing, by the processor based on the determination that the motion of the user toward the border region has not stopped, the presentation of the one of the bounce effect or the space transforming effect.

7. A non-transitory computer-readable medium having stored therein, computer-executable instructions which, when executed by a computer, causing the computer to execute operations, the operations comprising:

tracking a motion of a user to present an image of a virtual space to the user;

performing, based on movement of an origin in the virtual space in a same direction as a movement direction of the user, distance control to increase a distance between a viewpoint of the user and a border region in the virtual space while an operation of the user coming closer toward the border region is being inputted, wherein the border region is at a specific position in the virtual space;

controlling presentation of one of a bounce effect or a space transforming effect in the image of the virtual space based on the distance control;

determining whether the motion of the user toward the border region of the virtual space has stopped;

stopping, based on the determination that the motion of the user toward the border region has stopped, the presentation of the one of the bounce effect or the space transforming effect; and continuing, based on the determination that the motion of the user toward the border region has not stopped, the presentation of the one of the bounce effect or the space transforming effect.

8. The information processing apparatus according to claim 1, wherein the CPU is further configured to repeatedly increase and decrease the distance between the viewpoint of the user and the border region, as the bounce effect.

* * * * *